United States Patent [19]

Linger et al.

[11] Patent Number: 4,950,150

[45] Date of Patent: Aug. 21, 1990

[54] BRIQUETTING MACHINE

[75] Inventors: Barry A. Linger, Dorset; Peter G. Williams, Norfolk, both of England; Reinhard Vitols, Tollerton, United Kingdom

[73] Assignee: Barrico Limited, Peterborough, England

[21] Appl. No.: 278,803

[22] Filed: Dec. 1, 1988

[30] Foreign Application Priority Data

Dec. 1, 1987 [GB] United Kingdom ................. 8728094

[51] Int. Cl.[5] ............................................. B29C 43/08

[52] U.S. Cl. ................................ 425/348 R; 425/350; 425/351; 425/DIG. 230

[58] Field of Search ............... 425/116, 237, 346, 350, 425/351, DIG. 230, 348 R; 264/109

[56] References Cited

U.S. PATENT DOCUMENTS

| | | | |
|---|---|---|---|
| 492,206 | 2/1893 | Hunter et al. | 425/237 X |
| 1,272,073 | 7/1918 | Majewski | 425/350 |
| 1,343,120 | 6/1920 | Dykeman | 425/350 |
| 1,986,365 | 1/1935 | Scholz | 425/350 X |
| 2,979,799 | 4/1961 | Decker | 425/DIG. 230 |
| 3,905,737 | 9/1975 | ven der Lely et al. | 425/DIG. 230 |

FOREIGN PATENT DOCUMENTS

| | | | |
|---|---|---|---|
| 1353610 | 11/1987 | U.S.S.R. | 425/237 |
| 2161742 | 1/1986 | United Kingdom | 425/DIG. 230 |

*Primary Examiner*—Richard L. Chiesa

*Attorney, Agent, or Firm*—Gifford, Groh, Sprinkle, Patmore and Anderson

[57] ABSTRACT

A briquetting machine, primarily intended for briquetting fibrous plant material, includes a pair of rotatable wheels. Each wheel has die means towards its outer periphery and the die means define a circular row of pockets in which the material is received and compressed. During rotation the wheels come together to define a nip between the wheels. To provide for a varying volume of feed of material the wheels are relatively movable to vary the size of the pockets. Furthermore the die means include male and female, overlapping dies. In the bases of the dies are located ejector members which are urged outwards to eject compacted briquettes from the dies. To compress the material prior to entry into the dies there may be a precompression channel which converges toward its outlet end, opposite converging walls of the channels being formed of compression members which move towards one another and towards the outlet end.

9 Claims, 7 Drawing Sheets

BRIQUETTING MACHINE

BACKGROUND OF THE INVENTION

I. Field of the Invention

This invention relates to briquetting machines and, in particular, to machines primarily intended to form compacted blocks or briquettes from crop residues such as straw or other fibrous material.

II. Description of the Relevant Art

It has been proposed, for example in British patent application No. 2161742, to form loose fibrous material into compacted blocks or briquettes by feeding partially compressed material between a pair of rotating wheels in which pockets are formed, the material entering the pockets and being compacted as the wheels approach one another.

SUMMARY OF THE PRESENT INVENTION

It is an object of the invention to provide an improved briquetting machine.

According to one aspect of the invention a briquetting machine comprises a pair of rotatable briquetting wheels each wheel having towards its outer periphery die means defining a circular row of briquetting pockets, the wheels being arranged to come together to define a nip between the wheels at which material is compacted in the pockets, the wheels being relatively movable, at least in the region of the nip, to vary the volume of the pockets in this region, the die means including male and female dies, the dies being arranged to receive material to be compacted, the male die means on one wheel locating within and overlapping the female die on the other wheel, the overlap being greater or less depending on the extent of relative movement between the wheels, in order to vary the volume of said pockets.

Such an arrangement is useful in the case in which the volume of material to be briquetted changes so that, within defined limits, the changes in volume can be accommodated without significant changes in the pressure imparted on the material or in the speed of the wheels.

Preferably the die means in the wheels are located in planes inclined at an acute angle to one another, the axes of rotation of the wheels being similarly inclined, and the wheels are rotated in the same direction and at the same speed. In this arrangement those portions of the wheels which are closest to one another and which define the region of nip are moved relative to one another to vary the volume of the pockets.

Conveniently such movement may be by having one wheel substantially fixed and by urging the other wheel towards the fixed wheel under a predetermined force whereby if the quantity of material in the pockets exceeds or falls below a predetermined amount the movable wheel moves away from or towards the other wheel against said force or by virtue of said force respectively.

Conveniently the die means on each wheel includes alternating male and female dies and the overlap between male and female dies of the wheels corresponds to the relative positions of the wheels.

The male and female dies may each be of rectangular cross-section with the inner dimension of the female die being larger than the outer dimension of the male die at its outer edge whereby to admit the male die a variable distance depending on the relative positions of the associated wheels.

The female dies conveniently each include a depression which tapers inwardly away from its outer edge and in the base of the depression is an ejector member movable into the depression after compaction of the material to release the compacted material from the die.

The male die may also include a depression which lies opposite that of the female die when the dies are in the region of the nip of the wheels, the two depressions defining a pocket. In this case the material to be compacted enters the area between the depressions before the depressions come together in the region of the nip and when the dies are fully mated together in the region of the nip the depressions and the individual pockets are filled with compacted material in the form of briquettes or blocks. The depressions form a continuous row of pockets around the wheels and the die means are formed such that the briquettes are separated from one another upon discharge.

According to a second aspect of the invention a briquetting machine includes a pair of rotatable briquetting wheels, each wheel having towards its periphery die means defining at least one circular row of pockets around the wheels, the wheels being arranged to come together to define a nip between the wheels at which material is compacted in the pockets, the pockets being defined by die means on each of the wheels, the die means on one wheel cooperating with the die means on the other wheel and the die means for each pocket including ejector means for ejecting the briquettes from the pocket after compaction, the ejector means including an ejector member in the base of each of the die means defining each pocket, the ejector members being movable towards one another as the associated portions of the wheels move away from the nip between the wheels whereby the ejector members release the associated compacted briquettes from the pockets.

In practice the ejector members in moving towards one another may temporarily grip the associated briquette between them as the wheels rotate away from the nip until the members reach the limit of their travel and the briquette is then released.

Preferably the ejector members are biased towards the ejection position but are pushed to the base of the associated die means while material is being compacted by the force of compaction. The members are conveniently spring biased towards the ejection position.

Alternatively the ejection members can be cam operated to be moved to the desired ejection position over that region of the wheels' rotation when ejection is required. As a further alternative the ejection members may be operated hydraulically or by compressed air.

According to a third aspect of the invention a briquetting machine includes a pair of rotatable briquetting wheels each wheel having towards its outer periphery die means for defining at least one circular row of pockets, the wheels being arranged to come together to define a nip between the wheels at which the die means compact material to form briquettes, the die means in each wheel comprising alternating male and female dies a male die of one wheel mating with a female die of the other wheel at said nip to define a briquette pocket.

The male and female dies may each be substantially rectangular in cross-section, the depth of the female dies being greater than the depth of the male dies and the dies each tapering inwards from their outer edges. Moreover the edges of each female die may receive the edges of the cooperating male die so that the edges overlap.

According to a fourth aspect of the invention a precompression mechanism which may be used with the briquetting machine of the invention to precompress the material before it is fed to the compaction stage, comprises a converging channel defined by a plurality of upper and lower compression members, and constraining means at the sides of the channel, each of the compression members being driven to execute an operative movement towards the opposite member and towards the narrower end of the channel, and each of the compression members having projections directed towards the opposite upper or lower members and lying in a row extending in the direction of the channel, whereby material entering the wider end of the channel is moved towards the narrower end of the channel and is compressed between the compression members during said movement.

The movement of the compression members is preferably arranged so that the movement of each member towards the opposite members is greater towards the wider end of the channel than at the narrow end of the channel. In one arrangement the compression members towards the narrower end of the channel are limited to a backwards and forwards or conveying movement.

Conveniently the probjections extend a greater distance towards the opposite compression members at the wider end of the channel than at the narrower end of the channel.

Each compression member may be elongated and extend in the direction of the channel and the members may be in pairs of one of the pair located on the upper and one on the lower side of the channel and opposite one another. The pairs of members may be operated in synchronism in moving towards and away from one another. Pairs of compression members may alternate across the width of the channel, adjacent pairs operating 180° out of synchronism with one another.

The converging channel may be preceded by rollers through which material is fed and compressed before further compression in the channel.

The compressed material from the converging channel, which may be compressed in the ratio of between 1:1 and 6:1, may be fed to the briquetting wheels previously described or the compressed material may be baled or otherwise disposed of.

BRIEF DESCRIPTION OF THE DRAWING

Further features of the invention will appear from the following description of an embodiment of the invention given by way of example only and with reference to the accompanying drawings, in which.

DETAILED DESCRIPTION OF THE PREFERRED EMBODIMENT OF THE PRESENT INVENTION

Figure 1:
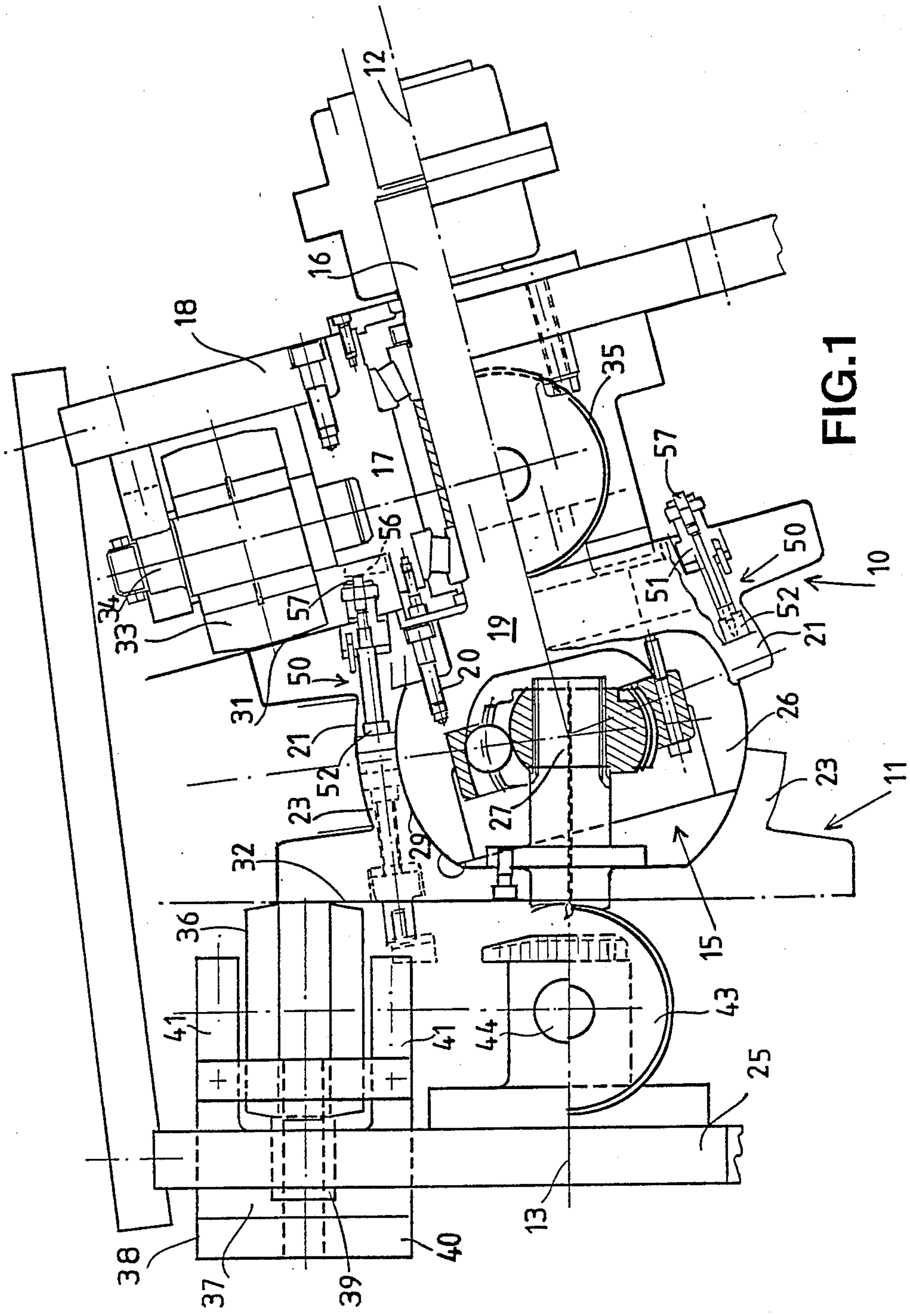
FIG. 1 is a part-sectional side elevation of part of a briquetting machine.

Referring to the drawings and firstly to FIGS. 1–4 a briquetting machine is shown in which two briquetting wheels 10 and 11 are provided which rotate about axes 12 and 13 respectively. The wheels 10 and 11 rotate in the same direction and the axes 12 and 13 are inclined at an acute angle, in this case $7\frac{1}{2}$°, to one another.

One of the wheels, wheel 10, is driven by a prime mover (not shown) and is connected by a constant velocity joint 15 to the other wheel 11 to drive the wheel 11. The wheel 10 is connected to a drive shaft 16 which is carried in bearings 17 in a fixed support 18 and the shaft 16 carries a central hub 19 to which the wheel 10 is attached by bolts 20 (only one of which is seen in FIG. 1).

Figure 6:
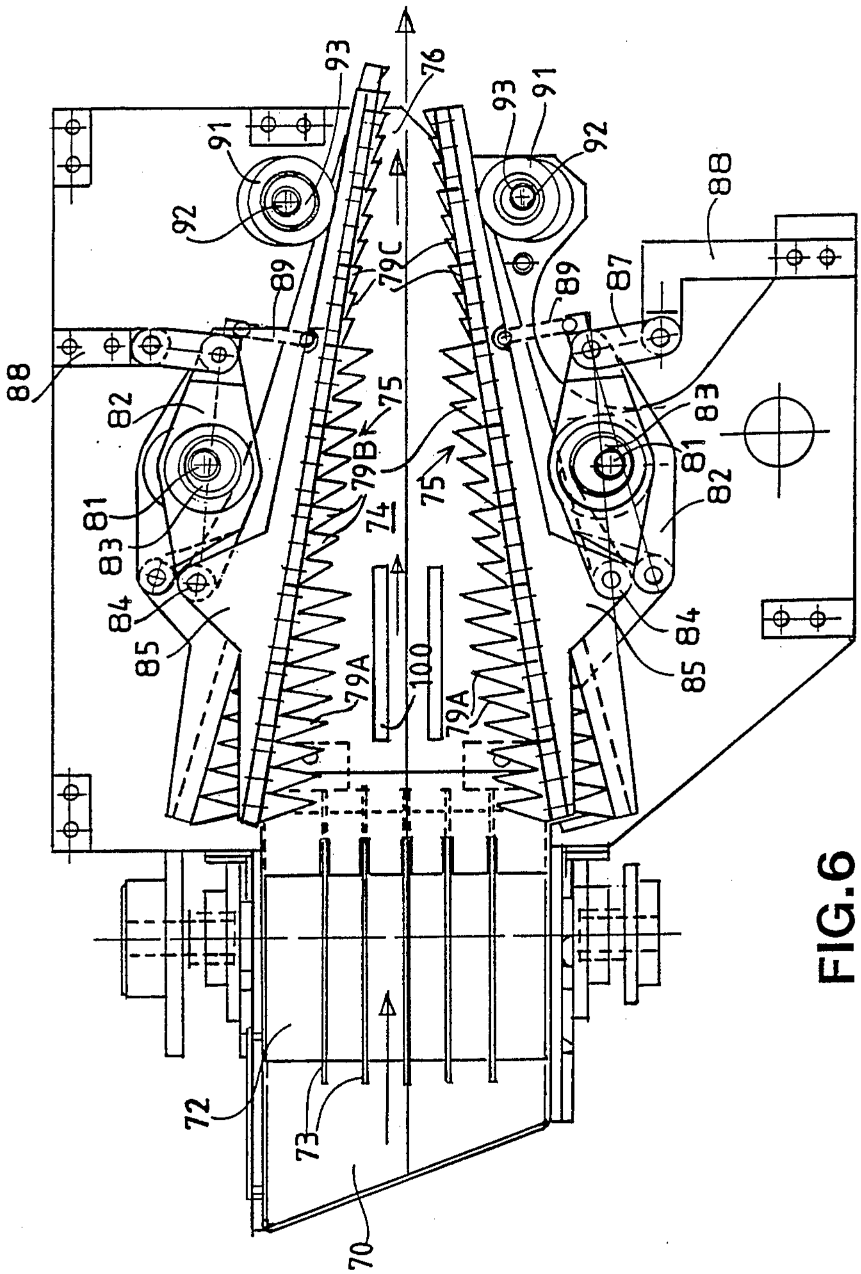
FIG. 6 is a longitudinal cross-section on the line B—B in FIG. 5.

The wheel 10 has a generally annular portion 21 in which a circular row of briquette dies (to be described) are located and the dies lie in a plane inclined to a plane in which the corresponding dies of the other wheel 11 are located. Thus as the wheels 10 and 11 rotate the dies approach one another to a position at one side of the wheels (at the top position as shown in FIG. 6) in which the dies are closely adjacent one another, which is termed the nip position. At the opposite side of the wheels (the bottom position as shown in FIG. 1) the dies are at their furthest position from one another. Material to be compressed in the dies is admitted between the wheels 10 and 11 at a position intermediate these two positions. As thus far described the wheels operate in a similar manner to that described in British patent application No. 2161742A.

The driven wheel 11 has a similar generally annular portion 23 carrying dies of a similar form to the dies on the drive wheel 10 and the wheel 11 is carried on the joint 15 for rotation relative to a fixed wheel support 25. The constant velocity joint 15 has a drive position 26 fixed in relation to the fixed drive wheel 10 and a driven portion 27 fixed in relation to the wheel 11 but movable relative to the drive portion 26 of the joint. The constant velocity joint 15 may be of any convenient kind able to accommodate the movements and forces involved, for example a constant velocity joint from the Dana Corporation has been found to be suitable.

The drive portion 26 of the joint 15 has an outer part-spherical surface 29 and the inner surfaces of the wheels 10 and 11 are shaped to conform to this surface. In the case of the wheel 11 when relative movement between the wheels 10 and 11 takes place, as will be described, the inner surface of the wheel 11 moves over the outer surface 29.

Each of the wheels 10 and 11 has a rear face 31 and 32 respectively which lies in a plane at a right angle to the respective axes of rotation and which extends radially beyond the location of the die carrying portions 21 and 23. In the case of the wheel 10 the face 31 is engaged by a roller 33 mounted for rotation about an axis parallel to the face 31 and on an axle 34 secured to the support 18. The roller 33 engages the wheel 10 to the rear of the nip region of the wheels.

Two further rollers 35 (only part of one of which is seen) are also located to engage the rear face 31 of the wheel 10 and the rollers 35 are each displaced from the rollers 90° about the axis of the wheel 10. The rollers 35 are similarly mounted for rotation about axes parallel to the face 31 on axles (not shown) mounted on the support 18.

The rollers 33 and 35 each provide support for the wheel 10 during operation to counteract the forces generated by the briquetting operation.

The driven wheel 11 has a different arrangement of rollers from that of the wheel 10 in order to cause the wheel 11 to move in accommodating different volumes of material fed to the wheels. The wheel 11 has a roller 36 which engages the rear face 32 of the wheel 11 and the roller 36 rotates about an axis parallel to the face during rotation of the wheel and is mounted on an axle (not shown). However, whereas for roller 33 the axle is fixed in relation to its associated support, the axle for roller 36 can move in a direction at a right angle to its axis of rotation. Such movement may be achieved as a result of a predetermined force being applied by spring means, for example a Belville spring arrangement, by a hydraulic piston and cylinder arrangement, or by other means whereby the roller 36 is resiliently loaded against the wheel 11. In the illustrated arrangement the load is applied by resilient means, in this case a hydraulic piston 37, mounted in a housing 38, a portion 39 of the resilient means being fixed to the support 25 and another movable portion 40 being connected to arms 41 which support the axle of the roller 36. Thus on movement of the piston 37 of the roller 36 is moved backwards and forwards and the wheel 11 is moved towards and away from the wheel 10 over the region of the nip. During such movement the wheel 11 pivots about the centre of the constant velocity joint 15 which lies at the centre of the curvature of the surface 29, and the inner surface of the wheel 11 slides over the surface 29 of the joint.

The effect of the resilient means 37 is to apply a generally constant force urging the dies in the wheels 10 and 11 together, and the pressure applied to the material in the dies remains generally constant. Thus a variation in the quantity of material supplied to the dies can, within certain limits of, for example the order of 10–20%, be accommodated without significant change in the density of the resulting briquettes.

The wheel 11 is also provided with two further rollers 43, only one of which is shown, which, like rollers 34, are displaced 90° about the axis of the wheel 11 from the roller 36 and lie to each side of the roller 36. The rollers 43 rotate about axes parallel to the face 32 and engage the face to support the associated wheel and, in this case, to act as fulcrum points for the movement of the wheel under the action of the resilient means 37, as previously described. The rollers 43 are mounted on axles 44 carried on the fixed support 25 for the wheel 11.

It will be appreciated that the wheel 11 is supported during operation by the constant velocity joint 15 and by the rollers 36 and 43, the support 25 acting as a support for the rollers.

FIG. 1 also shows ejector means 50 by which the compacted briquettes may be ejected from the associated dies. The ejector means 50 is in this case a piston 51 secured at one end to an ejector head 52 which forms part of the base 53 of a die. Each of the dies in each of the wheels 10 and 11 incorporates such an ejector means and the piston 51 and head 52 are movable along an associated bore 54 in the wheel to eject the briquettes after the wheels have passed the region of the nip of the wheels.

The ejector means 50 may be operated by various means. As shown in FIG. 1 such means is a cam track 56 carried on the fixed support 18 or 25 which is arranged to contact a follower 57 at one end of each piston 51 to move the piston 51 along the bore 54 and eject the briquette from the die. It will be appreciated that the ejector means operates simultaneously from opposite sides of each pair of dies to push the briquette out of the dies and temporarily to grip the briquette between the oppositely-directed heads 52 of the ejector means. As the gap between the wheels develops away from the nip the briquettes fall away from between the heads 52 and arc discharged to a discharge conveyor (not shown).

The heads 52 and pistons 51 are released in the base of their associated dies by the incoming material which subsequently enters the space between the wheels and is pushed down into the dies as the wheels return towards the nip position thereby pushing the pistons and heads towards the bases of the dies.

As an alternative to the cam operated arrangement for the ejector means, as described, the ejector means may each include a spring between the piston and the wheel, the spring urging the head towards the discharge position. In operation the incoming material compresses the spring to force the head into the base of the die but when the briquette is formed the head pushes the briquette out of the die, as previously described. As a further alternative the ejector means may be operated by compressed air.

Referring now particularly to FIGS. 2, 3, 4A and 4B there is shown the arrangement of the dies. Each of the wheels 10 and 11 has an alternating row of male dies 60 and female dies 61, the wheels being arranged so that the male dies 60 on one wheel mate with the female dies 61 of the other wheel.

The male and female dies differ in that the generally rectangular cross-section of the female dies 61 have greater dimensions than the male dies 60 and the female dies are deeper than the male dies 60. Moreover each of the dies 60 and 61 have a generally tapering shape from their outer edges 62 and 63 but the inclination of the taper in the female dies 61 changes inwardly of its edges 62 from a wider to a narrower taper. In addition the edges 62 surrounding the depression defining each female die 61 protrudes beyond the lateral edges 63 of the adjacent male dies 60.

Figures 4A, 4B:
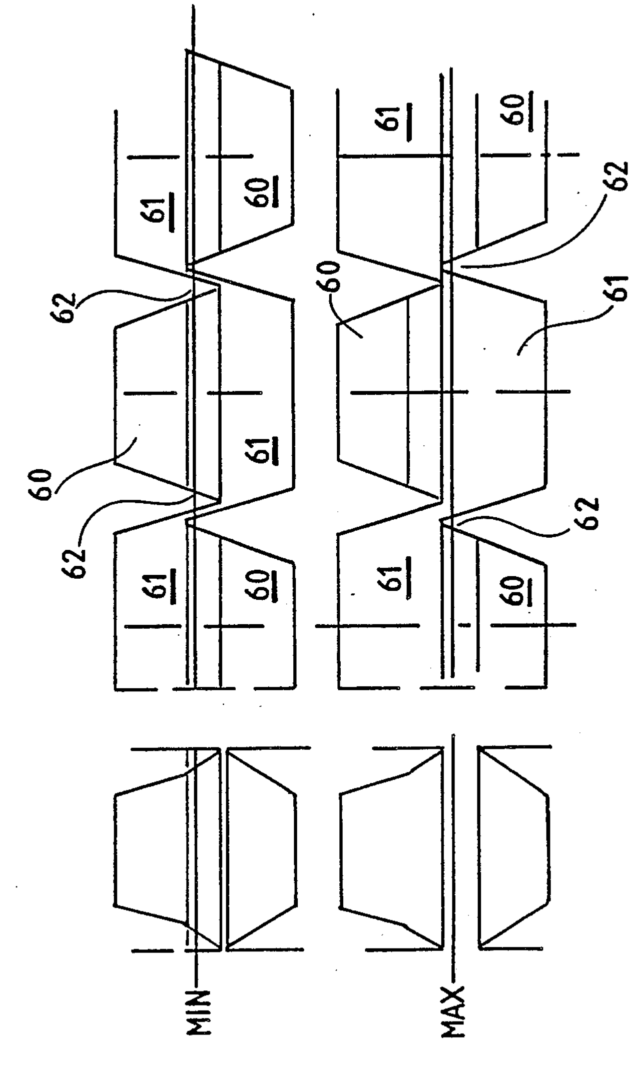
FIGS. 4A and 4B are schematic diagrams of the briquetting dies.

The dimensions and arrangements of the male and female dies are such that when the male and female dies are brought together the edges of the male die enter and overlap the edges of the female die as seen in FIGS. 4A and 4B of the drawings. The degree of overlap varies according to the position of the wheel 11 in relation to that of the wheel 10. Normally the variation in overlap can be between that shown in FIG. 4A in which the overlap is at a maximum and that shown in FIG. 4B in which there is zero overlap. It will be evident that maximum overlap is when there is relatively little material in the dies and conversely minimum overlap is when the dies are full. By this overlapping arrangement the quantity of material being briquetted can vary between 10°–20° to either side of the normal quantity at which the overlap would be in a mid position between those of FIGS. 4A and 4B.

The movement between the male and female dies is achieved by the arrangement shown in FIG. 1 but the die arrangement and the overlapping configuration may also find application with other kinds of briquetting wheels. For example the briquetting wheels may be of the kind in which two contrarotating rolls have peripheral pockets or dies. The rolls are driven about parallel axes. In this case the rolls may be relatively movable towards or away from one another and the dies may overlap in a similar manner to that described to vary the volume of material accommodated in each cooperating pair of dies.

Figure 2:
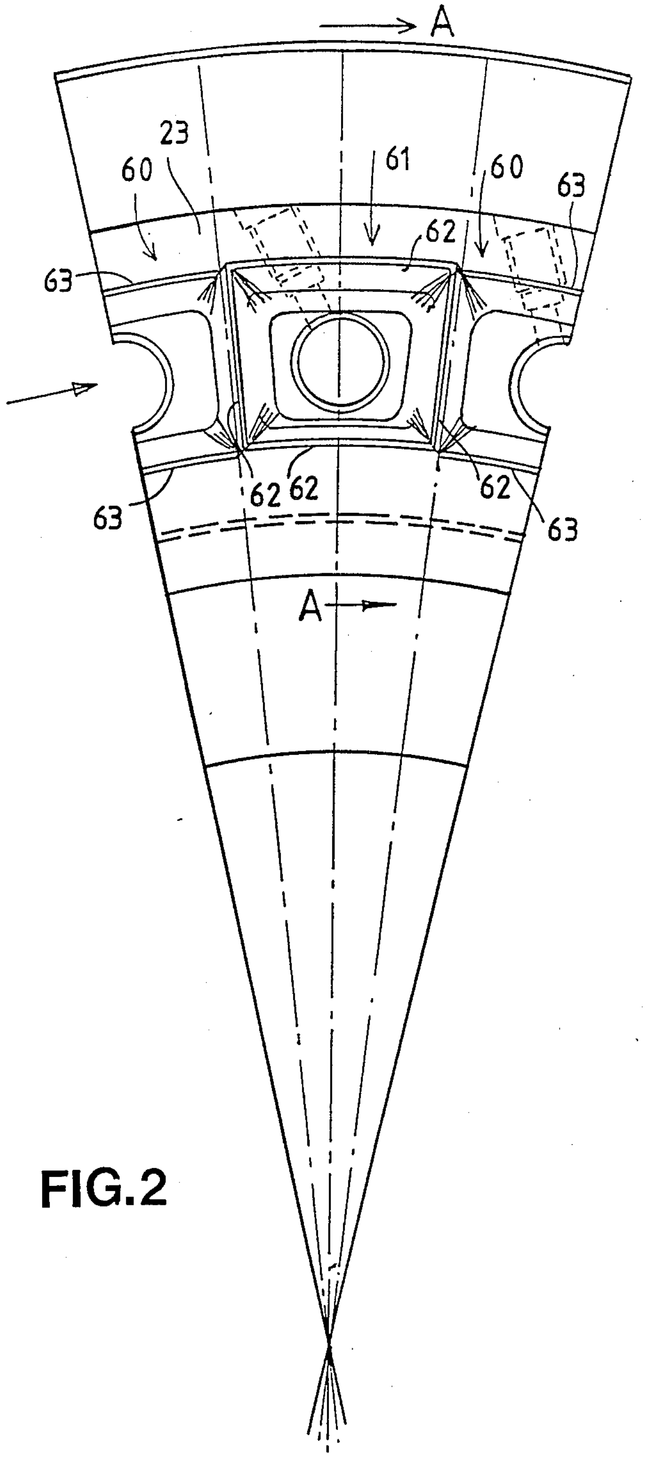
FIG. 2 is a front elevation of a segment of a briquetting wheel of the briquetting machine of FIG. 1.
Figure 3:
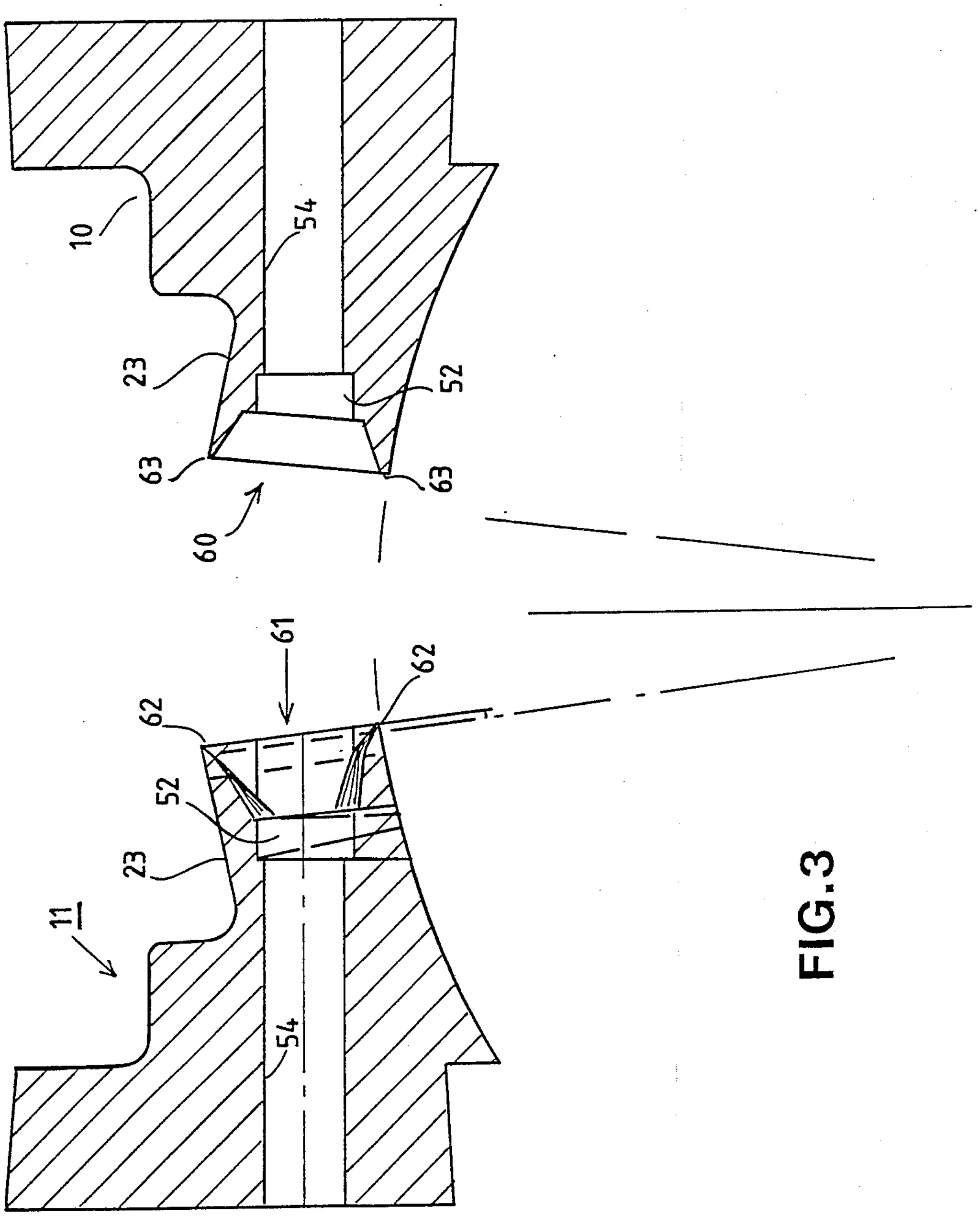
FIG. 3 is a section on the line A—A of FIG. 2 and a section of the cooperating part of the other corresponding briquetting wheel showing the cooperating dies.

As illustrated in FIGS. 2 and 3 each die, whether a male or a female die, accommodates in its base the head of the ejector means which is located in an enlarged portion of the bore 52 and adjacent said base.

The edges 62 and 63 of the dies present a generally triangular section (FIG. 3) so that the outwardly-directed apex is able to effect a shearing action between adjacent briquettes. If desired two mating rows of dies may be provided in the wheels, an inner row and an outer row.

Figure 5:
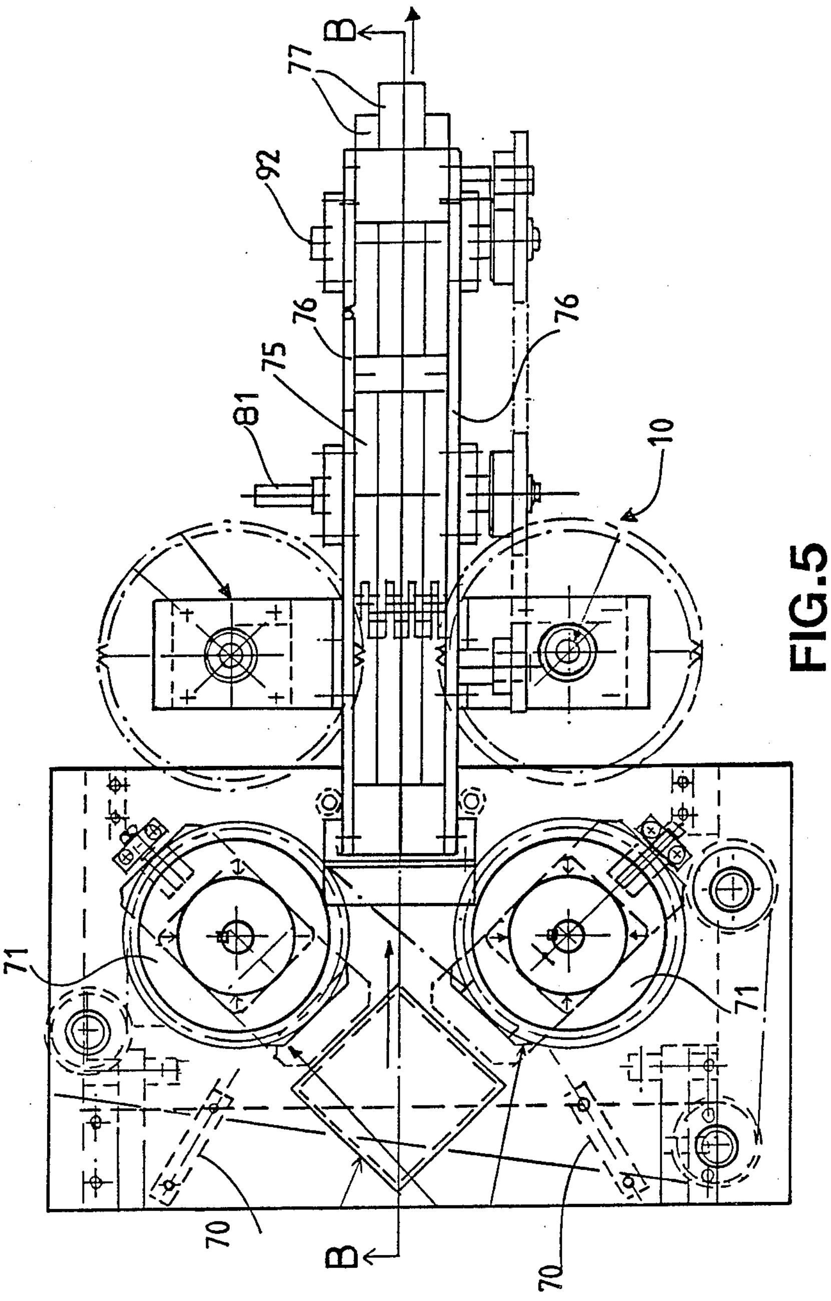
FIG. 5 is a plan view of a precompression device for use with the machine of FIGS. 1–4.
Figure 7:
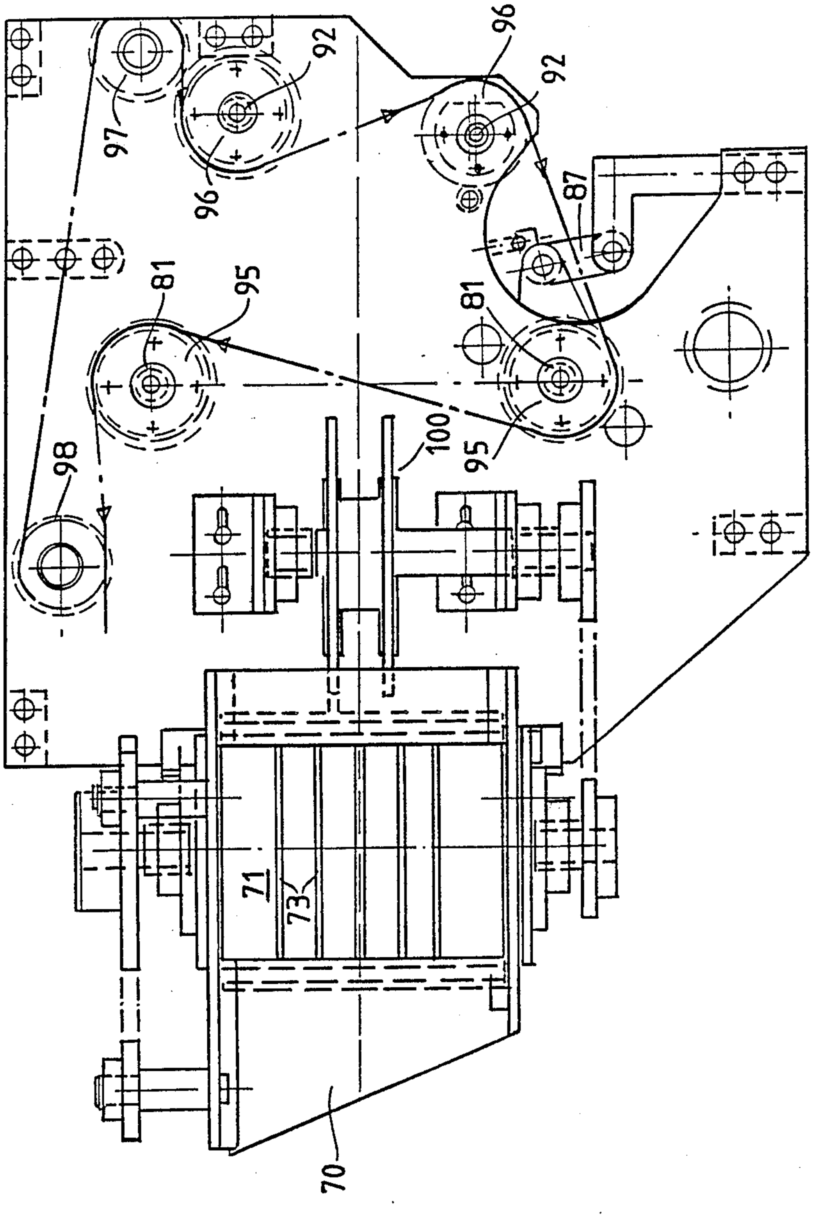
FIG. 7 is a side elevation of the device of FIGS. 5 and 6.

Referring now to FIGS. 5, 6 and 7 there is shown a feed and precompression system for compressing and feeding material to the briquetting machine of FIGS. 1–4.

In this arrangement the material is fed, for example by pick-up means (not shown) between guides 70 to a pair of rotors 71 which are located for drive about parallel vertical axes in opposite directions. The rotors 71 have axially-spaced annular protrusions 73 which serve to engage into the material and drag it through the space between the rotors 71.

From the rotors 71 the partially compressed material is passed into the wider end of a tapering channel 74 which is defined along its upper and lower sides by sets of conveying and compression members 75. At the sides of the members 75 the material is constrained by fixed side plates 76.

The sets of members 75 each include similar elongate elements 77 located side by side and in sliding contact with one another and each element 77 extends from one end to the other of the channel 74. Along their facing edges each element 77 has a series of projections 79 in the form of spikes and the length of those projections 79A adjacent the inlet and of the channel is grater than intermediate projections 79B, which in turn are greater than the projections 79C at the outlet or discharge end. In this way the projections are able to engage and move the relatively less dense material at the inlet end and also the denser material at the outlet end of the channel.

Four elements 77 are provided at the upper and lower sides of the channel and the elements are arranged in two groups of two pairs of elements. Thus the upper and lower elements at one side of the channel are grouped with upper and lower elements towards the other side and are separated by elements of the other group. Therefore elements in the upper and lower sides alternate in the two groups.

The elements in one group are moved by drive means, to be described, 180° out of phase with the elements in the other group but otherwise the movements of each group of elements are the same.

Each of the elements 77 is mounted on a rotary drive shaft 81 through a rocking lever 82 mounted on the shaft 81 by an eccentric or cam 83. The lever 82 is attached at one end 84 to a lug 85 on the element and at the other end to a link 87 attached to a fixed support structure 88. A spring 89 extends between said other end of the lever 82 and the element.

Adjacent the downstream or discharge end of each element is a driven roller 91 which engages the upper side of the elements and the roller 91 is driven by a shaft 92 through an eccentric 93.

The shafts 81 and 92 are driven by a chain which passes around sockets 95 and 96 at the ends of the shafts 81 and 92 and around an intermediate sprocket 97 and a drive sprocket 98.

As can be seen there is a shaft 81 and a shaft 92 above and below the upper and lower elements and the elements are each moved so that at the inlet end of the channel the movement is different from that at the discharge end. At the inlet end the elements each execute an operative movements towards the outlet end and towards each other and a return movement in the opposite sense. The extent of the operative movement of the elements towards each other decreases progressively in the downstream direction until, when the elements 71 are adjacent the rollers 91, the elements are constrained against movement towards one another and the movement is wholly one towards the outlet, longitudinally of the elements. However since the elements extend beyond the rollers 91 there is some limited movement of the elements towards and away from each other at the extreme outlet end.

The groups of elements are such that two pairs of elements are executing an operative movement when the other two pairs are executing a return movement.

As an optional feature there is also provided sets of wheels 100 at opposite sides of the channel which are arranged to engage the material and assist its progress towards the outlet end of the channel. The wheels 100 may have peripheral teeth to make gripping contact with the material.

The precompression system described may be arranged to obtain a compression ratio in the channel of between 1:1 and 8:1 depending on the nature of the material and on the degree of compression obtained by any preceding compression rollers. The compression ratio may be changed by varying the angle of taper between the upper and lower sides of the channel and by varying the throw of the eccentrics in the drive arrangement.

Although the precompression system has been described in relation to the briquetting machine it will be evident that the degree of compression which can be achieved makes the apparatus suitable for other purposes. Thus, for example, it may be used to compress straw so that the length of compressed straw issuing from the dowstream end of the channel can be baled after slicing it into discrete lengths.

In the specific arrangement described the length of straw formed issues from the channel and is guided and led to between the briquetting wheels 10 and 11 and in the region of the dies for further compaction in the dies to produce highly compacted briquettes in a continuous stream from the wheels.

The apparatus of the invention is primarily intended for producing briquettes for fuel, feed or other purposes from fibrous crop material such as straw. It may also find application with other crop materials or even with the compaction of particulate material.

We claim:

1. A briquetting machine for forming briquettes which comprises a pair of rotatable briquetting wheels each wheel having towards its outer periphery die means defining a continuous circular row of briquetting pockets, the wheels being arranged to come together to define a nip between the wheels at which material is compacted in the pockets, the wheels being movable relative to one another, at least in the region of the nip, in a direction generally transverse to the plane of rotation of the pockets to vary the volume of the pockets in this region, the die means including alternating male and female dies on each of the wheels and having outer edges, the male and female dies each being arranged to receive material to be compacted, the male dies on one of the wheels mating with the female dies on the other one of the wheels to define the pockets, and the outer edges of the male and female dies cooperating with one another to shear and separate any material joining successive briquettes, the mating male and female dies overlapping one another at their edges an extent of overlap depending on the extent of said relative movement between the wheels in order to vary the volume of said pockets.

2. A briquetting machine according to claim 1 wherein the wheels are located in planes inclined at an acute angle to one another, the axes of rotation of the wheels being similarly inclined, and the wheels in use being rotatable in the same direction and at the same speed.

3. A briquetting machine according to claim 1 wherein the portions of the wheels closest to one another and ajacent the nip are movable relative to one another by moving one of the wheels relative to the other wheel which is located in a fixed position, the movable wheel being urged towards the fixed wheel under a predetermined force whereby, if the quantity of material in the pockets exceeds or falls below a predetermined amount, the movable wheel moves away or towards the fixed wheel against said force or by virtue of said force respectively.

4. A briquetting machine according to claim 1 wherein the male and female dies are each of rectangular cross-section with the inner dimension of the female die being larger than the outer dimension of the male die at its outer edge whereby to admit the outer edge of the male die into the female die a variable distance depending on the relative positions of the wheels.

5. A briquetting machine according to claim 4 wherein the depth of the female dies is greater than the depth of the male dies and the dies each taper inwards from their outer edges, the outer edges of each female die being arranged to receive the outer edges of a cooperating male die so that the edges overlap.

6. A briquetting machine according to claim 1 wherein the female dies and the male dies each include a depression tapering inwardly away from its outer edge, depressions of the cooperating dies defining the pockets, and in the base of each said depression is an ejector member movable into the depression after completion of the material to thereby eject and release the compacted material from the die.

7. A briquetting machine for forming briquettes which includes a pair of rotatable briquetting wheels, each wheel having towards its outer periphery die means defining at least one circular row of pockets around the wheels, the wheels being arranged to come together to define a nip between the wheels at which nip material is compacted in the pockets, the pockets being defined by alternating male and female dies on each of the wheels, the dies having outer edges, the male dies on one of said wheels mating with the female dies on the other one of said wheels to define said pockets, and the dies for each pocket including ejector means for ejecting the briquettes from the pocket after compaction, and each said die including a depression having a base, the ejector means including an ejector member in the bases of each of the cooperating male and female dies, the mating male and female dies overlapping one another at their said outer edges to shear and separate any material joining successive briquettes, the ejector members of the cooperating dies being movable towards one another and away from the bases as the associated portions of the wheels move away from the nip between the wheels as the wheels rotate, whereby the ejector members release the associated compacted briquettes from the pockets and grip the briquettes between the ejector members.

8. A briquetting machine according to claim 7 wherein the ejector members are biased towards the ejection position.

9. A briquetting machine according to claim 7 wherein the ejector members are cam operated and movable to an ejection position over that region of the wheels' rotation which is after the wheels have passed the nip region.

* * * * *